United States Patent [19]

Usui

[11] Patent Number: 5,372,893
[45] Date of Patent: Dec. 13, 1994

[54] X-WRAPPED METALLIC HONEYCOMB BODY

[75] Inventor: Masayoshi Usui, Shizuoka, Japan

[73] Assignee: Usui Kokusai Sangyo Kabushiki Kaisha, Ltd., Shizuoka, Japan

[21] Appl. No.: 178,552

[22] Filed: Jan. 6, 1994

[30] Foreign Application Priority Data

Jan. 8, 1993 [JP] Japan ................. 5-016820

[51] Int. Cl.⁵ .................... B01J 32/00; B01J 35/04
[52] U.S. Cl. ................... 428/593; 428/598; 422/180; 502/439; 502/527
[58] Field of Search ........... 428/592, 593, 603, 598; 422/180; 502/439, 527; 29/890; 228/181

[56] References Cited

U.S. PATENT DOCUMENTS 5,105,539  4/1992  Maus et al. .................. 422/180
5,133,944  7/1992  Knetsch et al. .............. 422/180

FOREIGN PATENT DOCUMENTS 4016276    6/1991  Germany ................. 502/527
62-273051 11/1987  Japan .
1-218637   8/1989  Japan .
4-227855   8/1992  Japan .
92/02714   2/1992  WIPO ..................... 502/439

Primary Examiner—John Zimmerman
Attorney, Agent, or Firm—Lowe, Price, LeBlanc & Becker

[57] ABSTRACT

An X-wrapped metallic honeycomb body is provided for carrying thereon an exhaust gas cleaning catalyst. The honeycomb body has been constructed using at least two stacks each of which comprises planar band(s) and corrugated band(s) made from metal sheets and alternately stacked into a desired number of layers. Each of the stacks has a notched fitting portion so that the stacks are mutually fitted together at the notched fitting portions thereof. The stacks have been rolled in the same direction about the notched fitting portions thereof as a central axis of the rolling formation.

9 Claims, 4 Drawing Sheets

X-WRAPPED METALLIC HONEYCOMB BODY

BACKGROUND OF THE INVENTION a) Field of the Invention

This invention relates to a metallic honeycomb body which is generally used in a form interposed as exhaust gas cleaning means in an exhaust pipe system of an automotive vehicle.

More specifically, this invention is concerned with an X-wrapped metallic honeycomb body for carrying, especially an exhaust gas cleaning catalyst thereon, said honeycomb body having an increased carrying surface area in a central part thereof and improved durability.

b) Description of the Related Art

In automotive exhaust gas cleaning means of the above-described type, monolithic ceramic carrier bodies have been used to date. However, monolithic metallic carrier bodies are now attracting interests in place of such conventional carrier bodies.

In general, a metal-made, monolithic carrier body for carrying an exhaust gas cleaning catalyst is constructed from a honeycomb-shaped, multilayered composite body (hereinafter called a "metallic honeycomb body") and a metallic cylindrical casing having opening at opposite ends thereof so that the metallic honeycomb body can be inserted into the casing and then fixed on the casing. The metallic honeycomb body has been formed by stacking planar bands and corrugated bands, each of which is made from a heat-resisting steel sheet, in a mutually contiguous relation and rolling them together into a spiral form and defines a number of network-patterned, axial gas flow passages (hereinafter called "cells") for permitting passage of exhaust gas therethrough.

The metallic honeycomb body and the metallic casing are firmly fixed together by brazing or welding them so that the metallic honeycomb body can withstand thermal expansions and thermal stresses—which occur in a high-temperature atmosphere due to the high temperature of the exhaust gas itself and an exothermic reaction of the exhaust gas by the exhaust gas cleaning catalyst—and also extreme vibrations during running of the automotive vehicle.

Needless to say, the planar bands and corrugated bands which make up the metallic honeycomb body are fixed together at least some of areas of contact therebetween by brazing, welding or mechanical fastening to form the metallic honeycomb body into a vibration proof structure.

The metallic honeycomb body of the rolled type, a principal element of the above-described metallic carrier body, is superior in various aspects to the ceramic-made monolithic honeycomb body. There is however room for a further improvement with respect to large thermal stresses which occur under the severe thermal conditions described above.

In particular, an unduly large thermal stress concentrates on an outer peripheral portion of the metallic honeycomb body, said portion being in contact with an inner peripheral wall of the metallic casing, or a portion adjacent to the outer peripheral portion. The planar bands and corrugated bands of the metallic honeycomb body are therefore buckled, cracked or otherwise damaged so that the durability of the metallic carrier body is reduced.

As replacements for metallic honeycomb bodies of the above-described spirally rolled type, metallic honeycomb bodies having a honeycomb structure have been proposed recently. Each of these replacement metallic honeycomb bodies has the structure that, in each minimum unit making up the metallic honeycomb body, namely, in each minimum unit composed in combination of a planar band and a corrugated band arranged in a contiguous relation, the minimum unit is maintained at opposite end portions thereof in contact with an inner wall of an associated metallic casing. S-shaped or X-wrapped, metallic honeycomb bodies are proposed, for example, in Japanese Patent Application Laid-Open (Kokai) Nos. SHO 62-273051, HEI 1-218637 and HEI 4-227855.

In a metallic carrier body of the spirally-rolled type described above, each minimum unit is maintained at only one end portion thereof in contact with the inner wall of an associated metallic casing. In a metallic carrier body of the last-mentioned conventional type, however, each of a desired plural number of minimum units is maintained at both opposite end portions thereof in contact with the inner wall of an associated metallic casing. It is therefore possible to absorb or reduce a thermal stress at each end portion, so that improved durability is obtained.

Incidentally, the terms employed above to indicate the various shapes of the above-described metallic honeycomb bodies may be regarded as common names as will be described next.

Paying attention to one of the minimum units of a metallic honeycomb body, that is, to one multilayer unit consisting of a planar band and a corrugated band, the metallic honeycomb body is called an "S-shaped" metallic honeycomb body where the multilayer unit is curved in the form of letter S when the metallic honeycomb body is viewed at a front face thereof. In a metallic honeycomb body fabricated by making a desired number of stacks, typically four stacks—each being formed of such minimum units superposed one over the other in a desired number of layers—abut at one end portions thereof and then rolling the individual stacks about the abutting end portions thereof, the abutment of the four stacks is in an X-shaped (or swastika) pattern. Metallic honeycomb bodies of this type are therefore called "X-wrapped" metallic honeycomb bodies.

S-shaped or X-rapped metallic honeycomb bodies, which are different from those of the above-described spirally-rolled type, are accompanied by the following drawbacks:

(i) In an S-shaped metallic honeycomb body, each minimum unit consisting of a planar band and a corrugated band unavoidably includes sites where the bands are folded over 180°. Especially, the waveform of the corrugated band is therefore deformed because of the application of working stresses. It is therefore impossible to fabricate a metallic honeycomb body having uniform cells.

(ii) In an X-wrapped metallic honeycomb body, the state of abutment of each stack at a central part is such that the end portions of the individual planar band and corrugated bands of the stack are arranged in abutment against a planar band forming an outermost layer of the adjacent stack. In other words, the end portions of the individual bands forming each stack are abutted and fixed by brazing or the like at edges thereof in a point-to-point fashion to an outermost planar band of the adjacent stack. The mutual abutment and fixed securement of the individual stacks are not sufficient and, when deforming force due to a thermal stress, vibrations or the like is applied to the abutted portions, the durability of the metallic honeycomb body is significantly deteriorated.

As has been described above, metallic honeycomb bodies other than those of the spirally-rolled type, especially X-wrapped metallic honeycomb bodies therefore require special consideration to the durability of their central parts because of their structures.

SUMMARY OF THE INVENTION

An object of the present invention is to provide an X-wrapped metallic honeycomb body excellent in durability by incorporating durability-improving means in a central part thereof.

In one aspect of the present invention, there is thus provided an X-wrapped metallic honeycomb body for carrying thereon an exhaust gas cleaning catalyst, said body having been constructed using at least two stacks each of which comprises planar band(s) and corrugated band(s) made from metal sheets and alternately stacked into a desired number of layers, characterized in that:

(i) each of the stacks has a notched fitting portion so that the stacks are mutually fitted together at the notched fitting portions thereof; and (ii) the stacks have been rolled in the same direction about the notched fitting portions thereof as a central axis of the rolling formation.

Preferably, the notched fitting portion of each stack can be formed at a longitudinal central part thereof. The notched fitting portion of each stack may be in such a desired shape that, when the respective stacks are stacked and combined together at the notched fitting portions thereof, the resulting X-wrapped metallic honeycomb body is assured to have a flush front face and a flush rear end face.

The term "notched" as used herein shall not be construed to limit the shape of the notched fitting portion to any particular shape insofar as the above object of the present invention is attained.

The X-wrapped metallic honeycomb body according to the present invention is different from any metallic honeycomb body which is fabricated by abutting and fixing stacks at one end portions thereof, for example, four stacks at one end portions thereof into the form of letter X or a cross and then rolling them in the same direction.

The X-wrapped metallic honeycomb body according to the present invention is fabricated by providing as the individual stacks those having mutually-fitting, notched fitting portions, mutually fitting and combining the stacks at the notched fitting portions and then rolling in the same direction the thus-combined stacks, for example, two stacks fitted and fixed together in the form of letter X or a cross at the notched fitting portions.

The X-wrapped metallic honeycomb body according to the present invention does not use the fabrication method that, as in the conventional X-wrapped metallic honeycomb bodies, individual stacks are abutted and fixed together at one end portions thereof. The individual stacks are fitted and combined together, so that the X-wrapped metallic honeycomb body according to the present invention has excellent durability, especially at the center of its rolled structure.

In a conventional X-wrapped metallic honeycomb body, its central part is subjected to large thermal stresses and severe vibrations, leading to the potential problems that the abutted portions of its individual stacks may be separated and the individual bands (planar bands and corrugated bands) may be cracked or otherwise damaged due to the separation. In the X-wrapped metallic honeycomb body according to the present invention, however, such potential problems are prevented or reduced and further, falling of carried catalyst layers and a reduction in the cleaning efficiency of exhaust gas—which are induced in association with such problems—can be effectively prevented or reduced.

In the X-wrapped metallic honeycomb body according to the present invention, its structural elements, that is, the individual stacks are fitted and fixed together at the center of the rolled structure. It is therefore possible to prevent or otherwise reduce telescoping which tends to occur at a central part of a conventional X-wrapped metallic honeycomb body. The term "telescoping" means the phenomenon that the central part of the metallic honeycomb body is caused to project out in an axial direction due to thermal stresses, and is also called "filming-out". The prevention or reduction of telescoping has become feasible because thermal stresses are divided at the fitting portions and deforming forces interfere with each other there.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE INVENTION AND PREFERRED EMBODIMENTS

Figure 1:
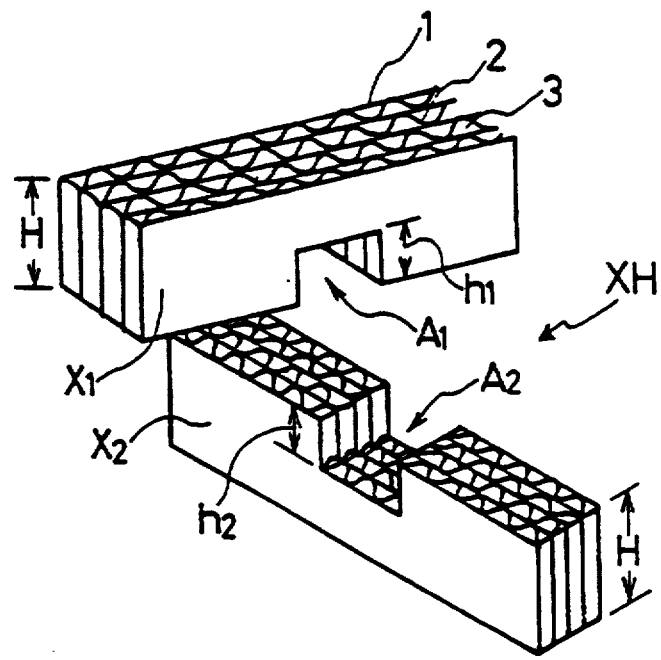
FIG. 1 is a perspective view of individual stacks forming an X-wrapped metallic honeycomb body according to a first embodiment of the present invention.

The technical features and preferred embodiments of the present invention will hereinafter be described in detail with reference to the drawings.

It is however to be borne in mind that the present invention shall not be limited to the preferred embodiments illustrated in the drawings.

First, a conventional X-wrapped metallic carrier body to which the present invention is applicable for its improvement will be described with reference to drawings.

Figure 8:
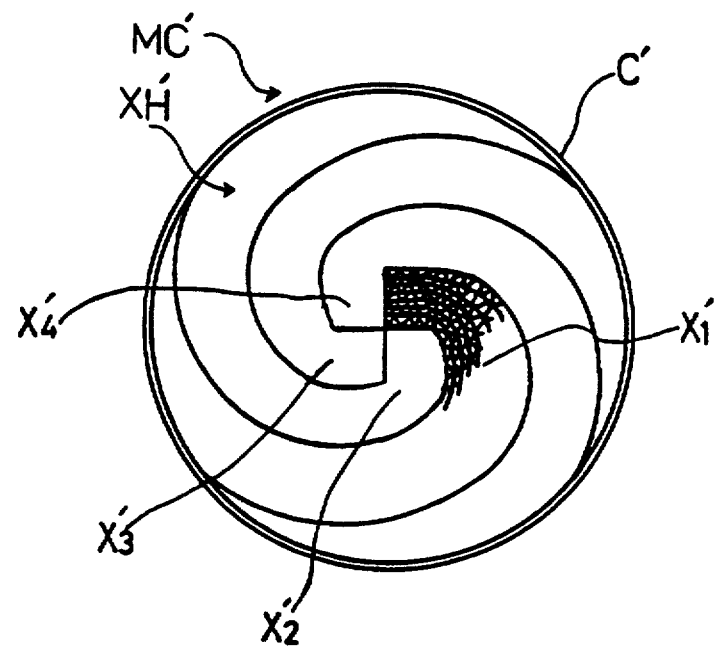
FIG. 8 is a front view of a metallic carrier body making use of a conventional X-wrapped metallic honeycomb body.

A X-wrapped metallic carrier body MC' of the above conventional type is illustrated in FIG. 8.

The X-wrapped metallic carrier body MC' is composed of an X-rapped metallic honeycomb body XH' and a metallic casing C' in which the honeycomb body XH' is accommodated and fixed.

The cross-sectional shape of each X-wrapped metallic carrier body according to the present invention is not limited to the one shown in FIG. 8 but can include an oval shape, a racetrack shape and the like disclosed, for example, in Japanese Patent Application Laid-Open (Kokai) No. HEI 4-227855.

The metallic honeycomb body XH' which is the principal element of the above-described conventional X-wrapped metallic carrier body MC' is fabricated by a process which comprises (a) providing at least two stacks individually formed by alternately stacking planar bands and corrugated bands, each made from a metal sheet, one over the other into a desired number of layers, (b) bringing the individual stacks into abutment against each other at abutting end portions thereof, said end portions being located at one ends of the stacks, by using a desired jig or the like and then (c) rolling the thus-abutted composite body in the same direction about the abutting end portions.

The X-wrapped metallic honeycomb body XH' shown in FIG. 8 has been formed by forming four stacks $X'_1$ to $X'_4$ in the step (a), bringing the individual stacks into abutment at abutting end portions thereof, said end portions being located at one ends of the stacks, at a crossing angle of 90° in the step (b) and then rolling the resultant composite body about the abutting end portions in the step (c).

In the conventional X-wrapped metallic honeycomb body XH' described above, the durability of its portions abutting the metallic casing C' (see FIG. 8) and portions adjacent to the former portions has been improved for the above-described reasons. The conventional X-wrapped metallic honeycomb body XH', however, has the following drawback.

Figure 9:
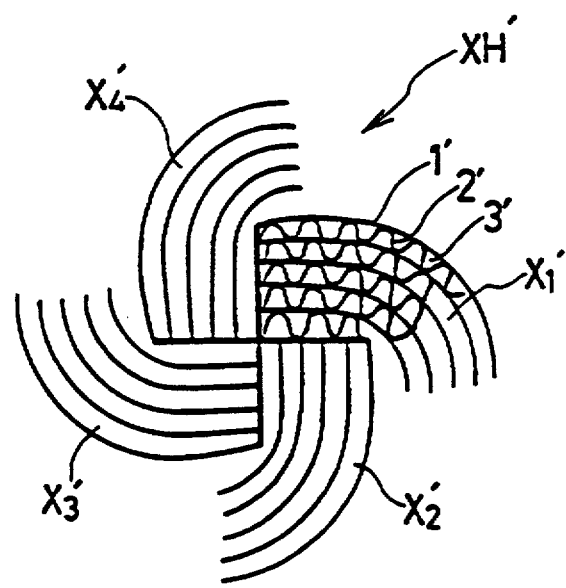
FIG. 9 is an enlarged view of a central part of a front face of the conventional X-wrapped metallic honeycomb body.

In the central part of the X-wrapped metallic carrier body XH' shown in FIG. 9, attention is drawn to the first stack $X'_1$ and the fourth stack $X'_4$. As is illustrate in FIG. 9, abutting end portions of the first stack $X'_1$ abut at right angles against a planar band (sheet metal) forming an outermost layer of the fourth stack $X'_4$.

When the abutting portions are observed microscopically, edge portions of the abutting portions of individual planar bands 1' and corrugated bands 2' forming the first stack $X'_1$ abut as lines at right angles against the planar band of the fourth stack $X'_4$ (line abutment). Even if the abutting portions are fixed by brazing or the like, no fully-fixed state can be obtained. When large thermal stresses and/or vibrations are applied to the fixed portions during the metallic carrier body XH' is used, the abutting portions may be separated and, due to the separation, the bands 1', 2' may be cracked or otherwise damaged. The durability is therefore impaired substantially. In FIG. 9, numeral 3' indicates cells.

The individual stacks $X'_1$ to $X'_n$ which make up the X-wrapped metallic honeycomb body XH' are not limited to the above-described ones shown in FIGS. 8 and 9, and stacks of various shapes and structures can be adopted. The above description applies equally to such stacks.

As described above, the present invention has a greatest characteristic feature in that means for improving the durability of a central part has been incorporated in view of the low durability at the central part of the conventional X-wrapped metallic honeycomb body XH'.

Therefore, the present invention features that it does not adopt the method that, as in the conventional structure, a desired number of stacks $X'_1$ to $X'_n$, n being an integer of at least 2, forming an X-wrapped metallic honeycomb body XH' are simply abutted against each other at abutting end portions located at one ends of the individual ends.

The present invention has a characteristic feature in that—as individual stacks $X_1$ to $X_n$, n being an integer of at least 2, making up an X-wrapped metallic honeycomb body XH—those provided at central parts thereof with mutually-fitting, notched fitting portions A are adopted.

In particular, preferred as the structure of the notched portions of the notched fitting portions A of the individual stacks $X_1$ to $X_n$ is such a structure that (1) the individual stacks $X_1$ to $X_n$ can be fitted together at the central parts thereof and (2) when the individual stacks $X_1$ to $X_n$ are fitted together at the notched fitting portions thereof and then rolled in the same direction about the notched fitting portions as a central axis of the rolling formation into the X-wrapped metallic honeycomb body XH, the X-wrapped metallic honeycomb body is assured to form a front end face $XH_f$ and a rear end face $XH_b$, preferably a flush front end face $XH_f$ and a flush rear end face $XH_b$ lying in common planes, respectively.

With reference to the drawings, a description will hereinafter be made of means for improving the durability of the central part of the X-wrapped metallic honeycomb body XH according to the present invention, more specifically of the notched fitting portions provided at the central parts of the individual stacks $X_1$ to $X_n$.

Figure 2:
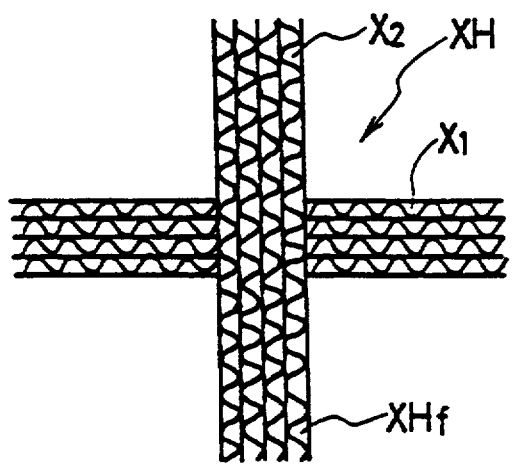
FIG. 2 is a front view of the stacks forming the X-wrapped metallic honeycomb body according to the first embodiment of the present invention, in which the stacks have been fitted and combined together.
Figure 3:
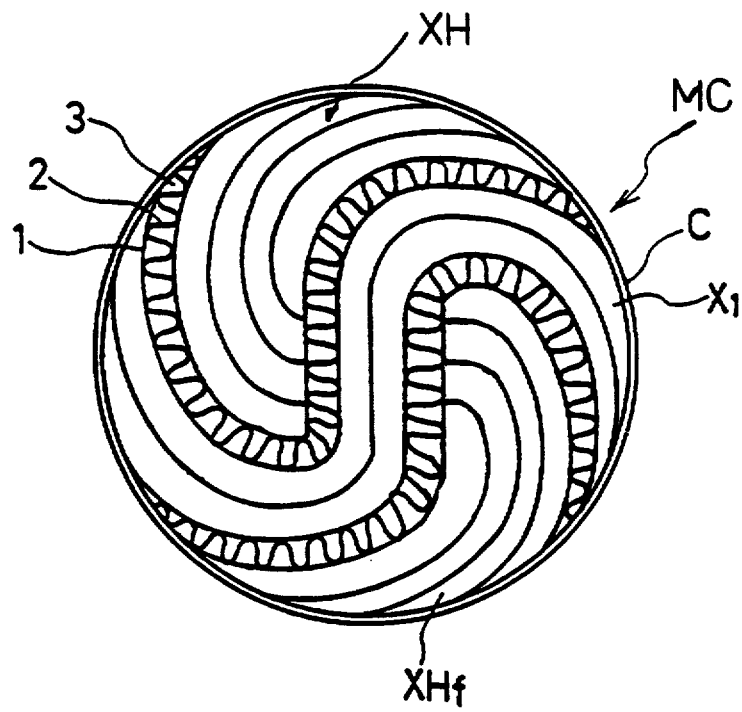
FIG. 3 is a front view of a metallic carrier body making use of the X-wrapped metallic honeycomb body according to the first embodiment of the present invention.

Referring to FIGS. 1 to 3, the X-wrapped honeycomb body XH according to the first embodiment of the present invention will now be described. The X-wrapped honeycomb body XH has been improved in durability at a central part thereof and is useful for the fabrication of an X-wrapped metallic carrier body.

As is shown in these drawings, the individual stacks $X_1$ to $X_2$ have been formed by alternately stacking planar bands 1 and corrugated bands 2 one over the other into a predetermined number of layers and providing notched fitting portions $A_1$ to $A_2$ at central parts of the individual stacks. The planar bands 1 are each made of a sheet metal, while the corrugated bands have been obtained by corrugating such planar bands.

The notched fitting portions $A_1$ to $A_2$ provided at the central parts of the individual stacks $X_1$ to $X_2$ preferably have such a shape that, when the individual stacks are fitted and combined together (the state shown in FIG.

2) and are then rolled in the same direction about the notched fitting portions as a central axis of the rolling formation into the X-wrapped metallic honeycomb body XH (the state depicted in FIG. 3), the front face $XH_f$ and rear face $XH_b$ of the metallic honeycomb body XH are flush in common planes, respectively.

As the planar bands 1 employed to fabricate the X-wrapped metallic honeycomb body in the present invention, it is possible to use bands employed for the fabrication of conventional main converters (MC) of the monolithic metal type, for example, bands having a thickness of from 0.04 mm to 0.1 mm and made, for example, of a chromium steel (chromium content: 13–25%), a heat-resistant Stainless steel such as Fe-20% Cr-5% Al, or a heat-resistant stainless steel formed by adding a rare earth metal to the first-mentioned stainless steel to improve the high-temperature oxidation resistance. Further, usable examples of the corrugated bands 2 include those obtained by corrugating such planar bands to have a predetermined, substantially sinusoidal or trapezoidal waveform.

Particularly preferred as the planar bands 1 and corrugated bands 2 are those obtained by subjecting planar and corrugated bands, which contain Al or carry an Al layer on surfaces thereof, to heat treatment so that a layer of alumina ($Al_2O_3$) in the form of whiskers or mushrooms is deposited on the surfaces thereof.

Layers of whisker-shaped alumina are preferred because they can firmly hold thereon a wash coat layer for carrying thereon an exhaust gas cleaning catalysts such as Pt, Pd and Rh.

In the present invention, the metallic carrier body MC shown in FIG. 3 is fabricated as described above, namely, by fitting and combining individual stacks $X_1$ to $X_n$ together at notched fitting portions thereof, rolling them about the notched fitting portions into a metallic honeycomb body XH and then fixing the metallic honeycomb body XH in a metallic casing C.

The metallic casing C is employed to accommodate and fix the X-wrapped metallic honeycomb body XH therein. No particular limitation is imposed on the metallic casing C insofar as it is open at opposite ends thereof and has the same cross-sectional shape as the metallic honeycomb body XH.

As the material of the metallic casing C, it is possible to use a heat-resistant steel of the same type as that of the bands 1,2 forming the honeycomb body or to use a material having still higher heat and corrosion resistance. It is also possible to use a material of such a double-layer structure that a metal material of an outer layer has higher heat and corrosion resistance than that of an inner layer, and specifically a double-layer material in which ferritic stainless steel is used for an inner layer and austenitic stainless steel is used for an outer layer.

Figure 6:
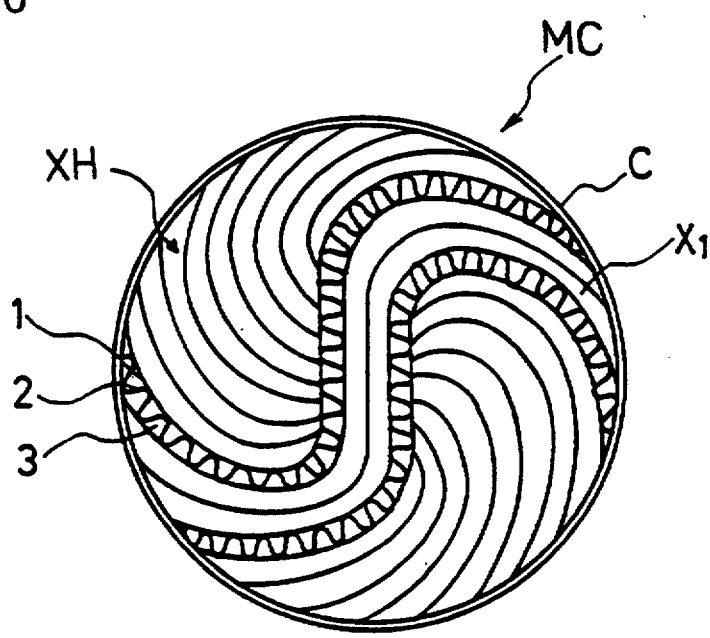
FIG. 6 is a front view of a metallic carrier body making use of the X-wrapped metallic honeycomb body according to the second embodiment of the present invention.
Figure 4:
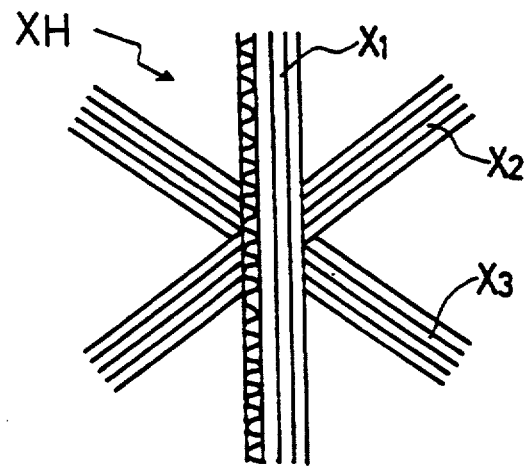
FIG. 4 is a front view of stacks forming an X-wrapped metallic honeycomb body according to a second embodiment of the present invention, in which the stacks have been fitted and combined together.
Figure 5:
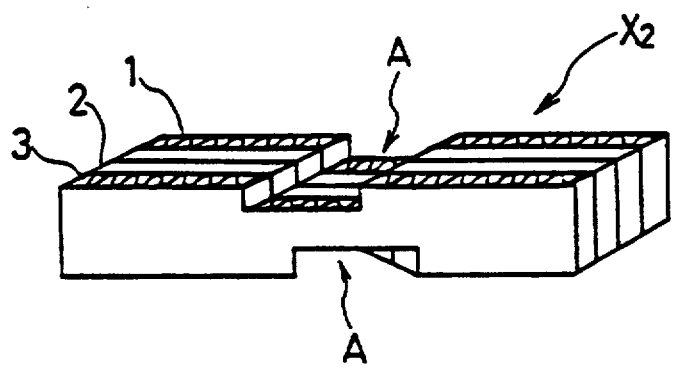
FIG. 5 is a perspective view of the second stack forming the X-wrapped metallic honeycomb body according to the second embodiment of the present invention.

Referring next to FIGS. 4 to 6, a description will next be made of the X-wrapped metallic honeycomb body XH according to the second embodiment of the present invention. The X-wrapped metallic honeycomb body XH possesses improved durability at a central part thereof.

As shown in FIG. 4, three stacks $X_1$ to $X_3$ are used in the second embodiment.

FIG. 4 corresponds to FIG. 2 of the first embodiment described above.

In the second embodiment of the present invention, the stack shown $X_2$ shown in FIG. 5 can be used as a second (middle) stack. No particular limitation is imposed on the shape or structure of each notched fitting portion A provided at a central part of the second (middle) stack $X_2$ as long as it can be fitted with a first stack $X_1$ and a third stack $X_3$ in such an arrangement as illustrated in FIG. 4. Namely, the notched fitting portions of the first to third stacks $X_1$ to $X_3$ are only required to have such shapes that the first stack $X_1$ and the third stack $X_3$ can be fitted in the second stack $X_2$ from front and rear sides thereof, respectively, with the first stack $X_1$ and the third stack $X_3$ forming a crossing angle of 120° therebetween (i.e., a crossing angle of 60° relative to the second stack $X_2$).

The third embodiment of the present invention will next be described with reference to FIG. 1. The third embodiment is therefore not illustrated in any of the drawings. Stacks are provided with notched fitting portions in the following relationship:

$$H > h_1 + h_2$$

wherein $h_1, h_2$: Depths of the notched fitting portions $A_1, A_2$ of the individual stacks $X_1, X_2$, and H: Height of the respective stacks $X_1, X_2$ (Incidentally, the height governs the width of a metallic honeycomb body when the stacks are formed into a metallic honeycomb body.).

In such an embodiment as the third embodiment, a space is formed at the notched fitting portions when the respective stacks are fitted together. When an X-wrapped metallic honeycomb body (XH) is fabricated from such a composite body, a space of a desired volume is formed at an axial central part and deforming forces developed by thermal stresses can be effectively absorbed and reduced in the case.

Figure 7:
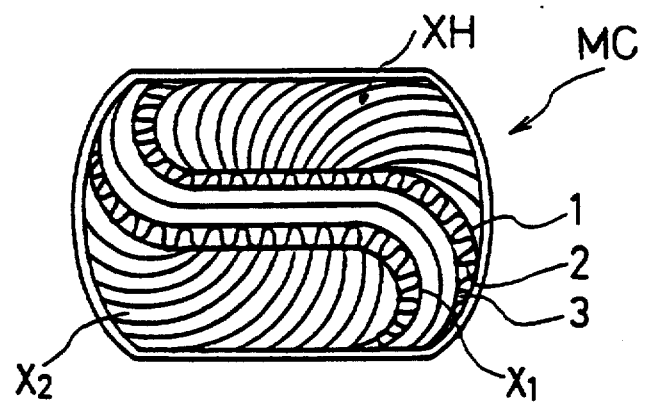
FIG. 7 is a front view of a metallic carrier body making use of an X-wrapped metallic honeycomb body according to a third embodiment of the present invention.

The fourth embodiment of the present invention will next be described with reference to FIG. 7. The shape of each X-wrapped metallic honeycomb body XH according to the present invention is not limited to such a circular cross-section as in the first embodiment but, as shown in FIG. 7, may be in the form of a racetrack as viewed in a cross-section.

What is claimed is:

1. In an X-wrapped metallic honeycomb body for carrying thereon an exhaust gas cleaning catalyst, said body having been constructed using at least two stacks each of which comprises planar band(s) and corrugated band(s) made from metal sheets and alternately stacked into a number of layers, the improvement wherein:
   (i) each of the stacks has a notched fitting portion so that the stacks are mutually fitted together at the notched fitting portions thereof; and
   (ii) the stacks have been rolled in the same direction about the notched fitting portions thereof as a central axis of the rolling formation.

2. An X-wrapped metallic honeycomb body according to claim 1, wherein the honeycomb body is constructed of two stacks.

3. An X-wrapped metallic honeycomb body according to claim 1, wherein the honeycomb body is constructed of three stacks.

4. An X-wrapped metallic honeycomb body according to claim 1, wherein the notched fitting portion of each stack is formed at a longitudinal central part thereof.

5. An X-wrapped metallic honeycomb body according to claim 4, wherein the honeycomb body is constructed of two stacks.

6. An X-wrapped metallic honeycomb body according to claim 4, wherein the honeycomb body is constructed of three stacks.

7. An X-wrapped metallic honeycomb body according to claim 4, wherein the notched fitting portion of each stack is in such a shape that, when the respective stacks are stacked and combined together at the notched fitting portions thereof, the resulting X-wrapped metallic honeycomb body is assured to have a flush front face and a flush rear end face.

8. An X-wrapped metallic honeycomb body according to claim 7, wherein the honeycomb body is constructed of two stacks.

9. An X-wrapped metallic honeycomb body according to claim 7, wherein the honeycomb body is constructed of three stacks.

* * * * *